United States Patent [19]
Roberson

[11] Patent Number: 5,867,364
[45] Date of Patent: Feb. 2, 1999

[54] CENTER WITH PIVOTING CONTROL DEVICE AND METHOD OF USING SAME

[75] Inventor: James A. Roberson, Seneca, S.C.

[73] Assignee: Square D Company, Palatine, Ill.

[21] Appl. No.: 889,110

[22] Filed: Jul. 7, 1997

[51] Int. Cl.[6] .................................................. H02B 1/04
[52] U.S. Cl. ............................................................ 361/610
[58] Field of Search ........................... 361/679, 608–610, 361/614, 622, 636, 725–727, 823–825, 831–836

[56] References Cited

U.S. PATENT DOCUMENTS

| | | | |
|---|---|---|---|
| 2,130,250 | 9/1938 | Reed | 361/610 |
| 3,170,091 | 2/1965 | Hudson | 361/608 |

Primary Examiner—Gregory Thompson
Attorney, Agent, or Firm—Larry I. Golden; Kareem M. Irfan

[57] ABSTRACT

The present invention includes a control device and a control center having at least one cell defining an interior space with a front face for receiving and electrically connecting the control device therein. The cell and control device have mounting for mounting at least one electrical component thereon. The control device pivots on a pivotal axis within the cell so that a rear mounting surface pivots away from a cell mounting surface to provide access to the rear mounting surface and the cell mounting surface through the front face of the cell. The control device is releasably fastened to the cell to prevent pivoting the control device while the control device is electrically connected. A method is included with the present invention for providing access to the interior space through a front face of a cell in a control center with a control device inserted therein.

18 Claims, 6 Drawing Sheets

CENTER WITH PIVOTING CONTROL DEVICE AND METHOD OF USING SAME

FIELD OF THE INVENTION

The present invention relates to control centers for distributing and controlling electrical service which provide cells for mounting individual control devices therein and, more particularly, to a control device assembly which pivots within its individual cell to provide access to the rear surface of the control device and the interior faces of the cell.

BACKGROUND OF THE INVENTION

Motor control centers, as well as other electrical equipment like switchgear, are equipped with draw-out type protective control devices such as fusible disconnect switches, circuit breakers, and fuse trucks. These control devices are inserted into individual cells or compartments within the center to establish mechanical and electrical contact with bus bars, load and line stabs, or similar electrical terminals.

Due to the size and weight of many control devices, they are usually mounted on a support frame with rails or rollers and slid into position. The control device module may include a pair of upstanding cradle arms that are attached to the racking mechanism which facilitates rolling or sliding the control device into engagement with the electrical power load lines in the cells of the control center.

This type of racking mechanism is well known in the art and is available from several manufacturers. For example, the Square D Company produces a line of DS type circuit breakers which operate in accordance with the above description. While the racking mechanism presently available performs well, it is unnecessarily costly and may include many separate parts that are disposed about the circuit device for performing various interlock functions to assure safe installation, operation, removal, and testing. Some racking mechanisms of other manufacturers occupy a substantial amount of space in the control device. Thus, other components and features of the control device are prevented from using this area.

Another problem has been on-site accessibility to electrical components which are mounted within the control device and within the interior space of the cell itself. To gain access to these components, the control device is usually removed entirely from cell. Only after completely disengaging the control device from the racking mechanism is sufficient space provided to access the electrical components mounted on the rear surface of the control device and on the rear panel of the cell.

There is a need for a space-saving, inexpensive, and simple assembly between the control device and the cell of the control center which does not interfere with the electrical components mounted therein or operation of the control center and the respective control devices.

SUMMARY OF THE INVENTION

The present invention includes a control device for a control center having at least one cell defining an interior space with a front face for receiving and electrically connecting the control device therein. The cell has a cell mounting surface facing the interior space. The device includes a front mounting surface for mounting at least one electrical component thereon. The front mounting surface partially defines a front face. A plurality of side walls are disposed in parallel relation to each other and perpendicular to the front face. A rear mounting surface is included for mounting at least one electrical component thereon. The rear mounting surface partially defines a rear face opposite the front face. The side panels and the front and rear mounting surfaces are secured together for insertion into the interior space of the cell so that the rear mounting surface faces the cell mounting surface. The device includes means for pivoting the control device on a pivotal axis within the cell so that the rear mounting surface pivots away from the cell mounting surface to provide access to the rear mounting surface and the cell mounting surface through the front face of the cell. The pivoting means is connected to the control device and to the cell. Means for releasably fastening the control device to the cell is included to prevent pivoting the control device while the control device is electrically connected. A portion of the fastening means is integrally formed with the side walls of the control device.

The present invention also provides a center for controlling electrical service with at least one control device. The control device has a mounting surface for at least one electrical component. The center includes a partially enclosed framework and at least one cell defined in the framework by a front face, by side panels disposed in parallel relation to each other and perpendicular to the front face, and by a mounting surface partially defining a rear panel of the cell opposite the front face. The side panels and rear panel are secured to the framework. The cell has an interior space for receiving the control device therein. The cell mounting surface faces the interior space and is adapted for electrically connecting to the control device mounting surface. The center includes means for pivoting the control device on a pivotal axis within the cell so that the control device mounting surface pivots away from the cell mounting surface to provide access to the cell mounting surface and the mounting surface of the control device through the front face of the cell. The pivoting means is connected to the control device and to the side or rear panels of the cell. Means for releasably fastening the control device to the cell is included to prevent pivoting the control device while the control device is electrically connected. A portion of the fastening means is integrally formed with the side panels.

A method is included with the present invention for providing access to the interior space through a front face of a cell in a control center with a control device inserted therein. The control device has a mounting surface for at least one electrical component. The cell has a cell mounting surface facing the interior space and is adapted for electrically connecting to the control device mounting surface. The steps of the method include: rotatably connecting at least two portions of a fastener between the control device and the cell within the interior space to define a pivotal axis; pivoting the control device on the pivotal axis within the cell so that the control device mounting surface pivots away from the cell mounting surface to provide access to the control device mounting surface and the cell mounting surface through the front face of the cell; and releasably fastening the control device to the cell to prevent pivoting the control device while the control device is electrically connected. Preferably, the pivoting step of the method includes sliding the control device at least partially through the front face of the cell either simultaneously or successively with the pivoting of the control device.

Accordingly, an object of the present invention is to provide a control device which reversibly provides accessibility to interior mounting surfaces to insert and remove electrical components associated with control centers.

Another object of the present invention is to provide a control device and control center cell assembly which easily mounts and provides more space for mounting electrical components in the control device and cell of the control center than available in the prior art.

Other and further advantages, embodiments, variations and the like will be apparent to those skilled in the art from the present specification taken with the accompanying drawings and appended claims.

Detailed Description of the Invention

Figure 1:
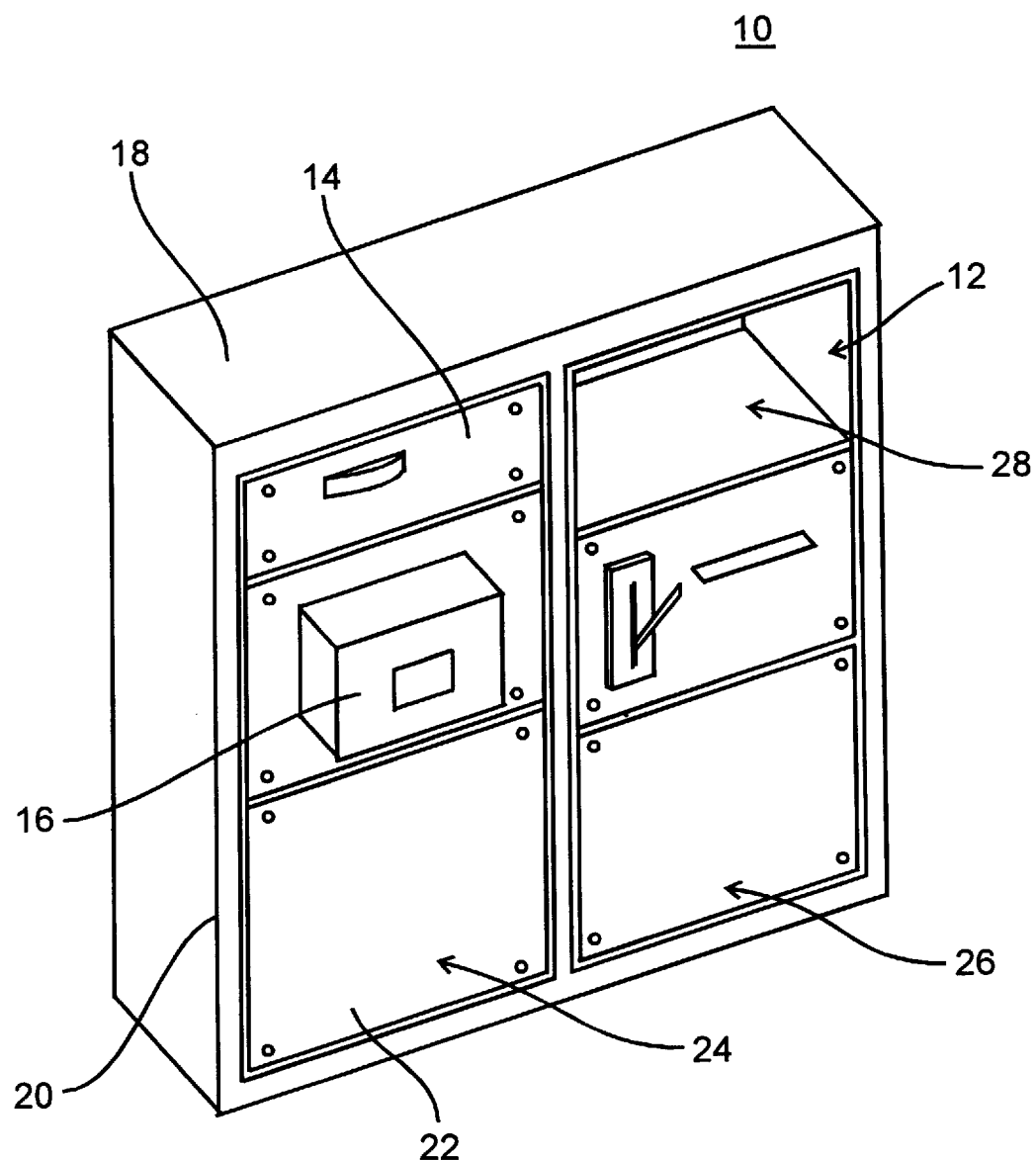
FIG. 1 is a perspective view of a control center defined by individuals cells and embodying the present invention.

Referring now to the drawings there is illustrated a control center embodying the present invention. In FIG. 1 the control center 10 is defined with a plurality of individual cells 12 occupied by different control devices shown typically by reference numerals 14 and 16. The control devices 14, 16 are removably accommodated within an interior space 28 defined by the respective individual cells 12. The control devices 14, 16 are typically similar in mechanical structure to one another although they may have different dimensions and include different electrical components.

A covered framework, generally designated as 18, at least partially encloses each control device 14, 16 leaving the front 20 of the framework open to insert the control devices 14, 16 therethrough. If the control center 10 is to operate for a long time period without a control device mounted in a particular cell, a cover panel 22 is placed over the opening of the particular cell in the front 20 of the framework while it is in operation.

The control center 10 also illustrates using the present invention with a variety of cell arrangements. The stacked configuration of individual cells in a first column 24 can be repeated any number of times as exemplified with a second column 26 of stacked individual cells 12.

Figure 2:
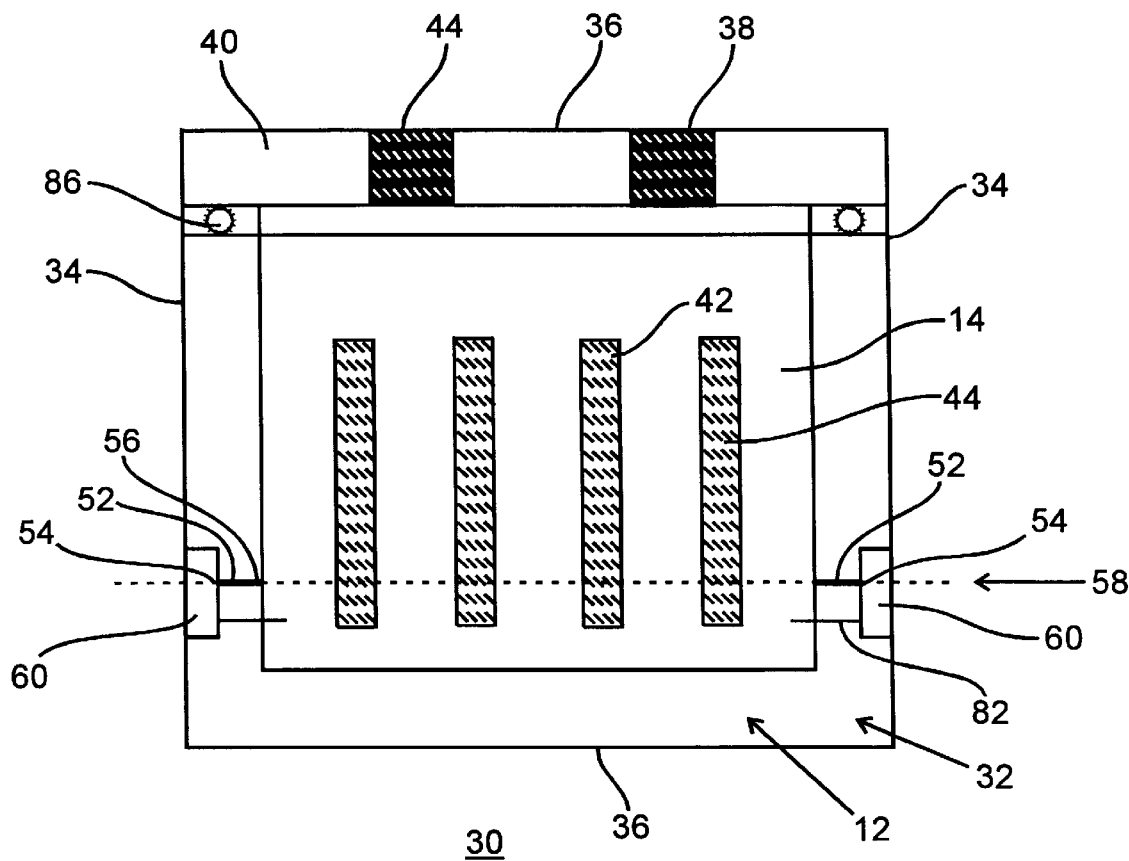
FIG. 2 is an isolated front view of an individual cell of a control center enclosing a control device in position for operation by connecting to the electrical service.
Figure 3:
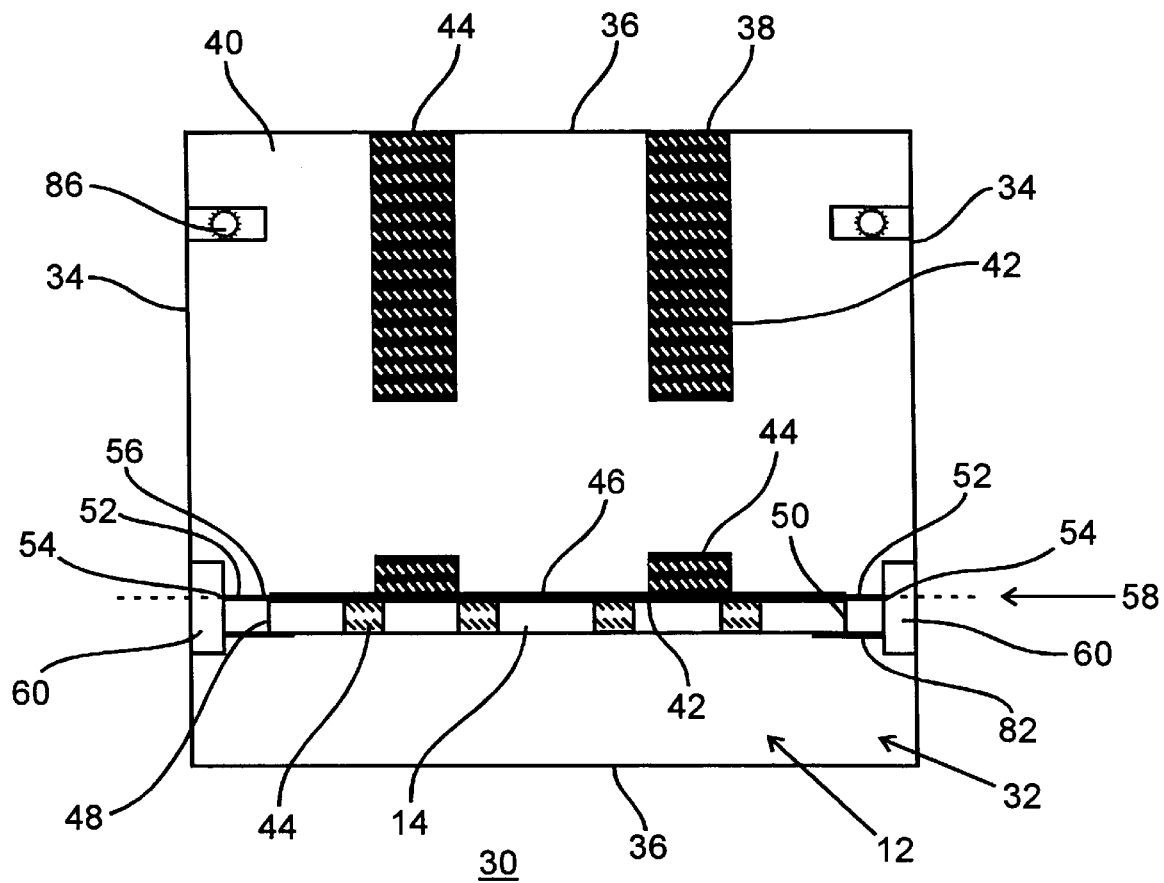
FIG. 3 is an isolated front view of the individual cell of the control center enclosing the control device in FIG. 2 which is pivoted in position for accessing interior electrical component mounting surfaces.

FIGS. 2 and 3 illustrate one preferred embodiment 30 of the present invention. The cell 12 is defined by a front face 32 and opposing side panels 34 and 36 which are disposed in a parallel relation to each other and perpendicular to the front face 32. A cell mounting surface 38 at least partially defines a rear panel 40 of the cell 12 opposite the front face 32 and faces the interior space 28. The cell mounting surface 38 is in proximity to the electrical service (not shown) provided to the control center 10. One or more electrical components 44 can be mounted on the cell mounting surface 38 and electrically connected to the electrical service. The side panels 34, 36 and the rear panel 40 are secured to the framework of the control center (as seen in FIG. 1).

The control device 14 includes a front mounting surface 42 and a rear mounting surface 46 for mounting one or more electrical components 44 thereon. The control device 14 is further defined by pairs of opposing side walls 48 and 50. Attached to the side walls 48 are a pair of mounting bolts 52. Each of the mounting bolts 52 is secured at one end 54 to one of the side walls 48. The opposite end 56 of each mounting bolt extends toward one of the side panels 34 of the cell and rotatably connects thereto. The mounting bolts 52 define and extend in a parallel direction along a pivotal axis 58 which is horizontal to the control center.

Figure 4:
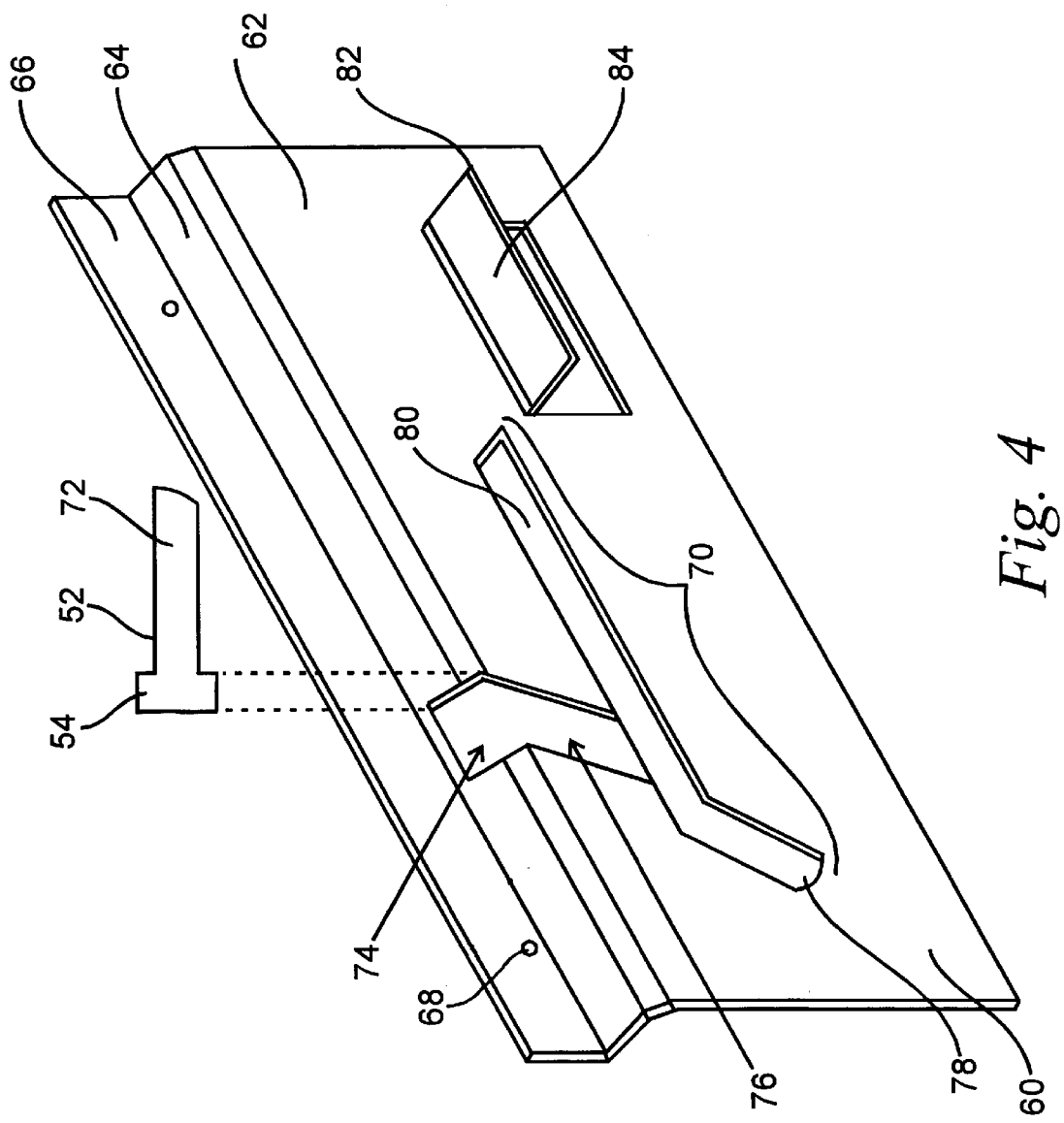
FIG. 4 is an isolated perspective view of a mounting bracket used in FIGS. 2 and 3.

Preferably, the mounting bolts 52 rotatably connect to mounting brackets 60 that attach to the side panels 34 of the cell. As illustrated in more detail in FIG. 4, each bracket 60 has an elongated body 62 which is integrally formed with a pair of upstanding ridges 64 which terminate with flanges 66. The flanges 66 abut the surface to which the bracket 60 is secured, such as the side panels. The flanges 66 include holes 68 to accommodate a fastener (not shown). The elongated body 62 includes a slot 70 which has a width sufficient to allow the body 72 of the mounting bolt to fit therethrough. The slot 70 extends to one of the upstanding ridges 64 with an open end 74. During installation of the control device 14 in the cell 12, the opposite end 54 of the mounting bolt is inserted through the open end 74 of the slot and moves downwardly through a diagonal channel 76 eventually coming to rest at one end 78 of the slot. The movement of the mounting bolt 52 during installation is in a generally vertical direction relative to the cell 12. The slot 70 is at least partially defined by the diagonal channel 76. Preferably, the opposite end 54 of the mounting bolt is larger in diameter than the body 72 of the mounting bolt and the width of the slot 70 to prevent the mounting bolt 52 from pulling out of, or otherwise disengaging from, the slot other than at the open end 74.

The slot 70 is preferably further defined by an elongated channel 80 which permits the body 72 of the mounting bolt to slide along its length which, in turn, allows the control device to slide towards the front face 32 of the cell (as seen in FIG. 2). The sliding movement provides greater separation between the cell mounting surface 38 and the rear mounting surface 46 of the control device. The sliding movement is particularly useful to provide greater access to the cell mounting surface 38 when the control device has been rotated about 90 degrees.

Each bracket 60 includes an integrally formed tab 82 which stops the rotation of the control device along the pivotal axis 58 at a pre-determined point. The tab 82 also allows the control device to rest against one of its surfaces 84 which supports the control device while access is provided to the cell. As seen in FIG. 3, the front mounting surface 42 of the control device 14 is resting against the surface 84 of the tab with the control device 14 rotated 90 degrees from a position where the cell mounting surface 38 and rear mounting surface 46 of the control device are parallel to a position in which the two surfaces are approximately perpendicular.

The present invention provides means for rotating or pivoting the control device 14 on a pivotal axis so that the rear mounting surface 46 of the control device pivots away from the cell mounting surface 38. FIG. 2 illustrates the control device 14 in its initial or operating position within the cell 12 where electrical connection is made to the cell mounting surface 38. It may be desirable to keep the control device electrically connected even after pivoting so as to troubleshoot the unit. The control device 14 is secured in the operating position by fasteners 86 which connect to the side panels 36 of the cell. Once the fasteners 86 are released, the control device 14 pivots to a position as illustrated in FIG. 3 providing accessibility specifically to the electrical components 44 and generally to the interior space 28 of the cell.

The pivot means of the present invention also provides for proper alignment between electrical components 44 on the rear mounting surface 46 and the cell mounting surface 38 so that the respective electrical components 44 can be reversibly mated for electrical and mechanical connection if desired. The pivot means reversibly disengage any electrical and/or mechanical connection between mating electrical components 44. Pivoting the control device 14 exposes the cell mounting surface 38 and the rear mounting surface 46 of the control device through the front face 32 of the cell and provides greater accessibility to the mounting surfaces.

Although mounting bolts 52 are described for connection to the brackets 60, any rotatably fastener or fastener assembly is suitable for use with the present invention. The pivotal axis 58 can be positioned at any point along the control device 14. The pivotal axis 58 can also extend in any direction other than horizontal as illustrated.

Figure 5:
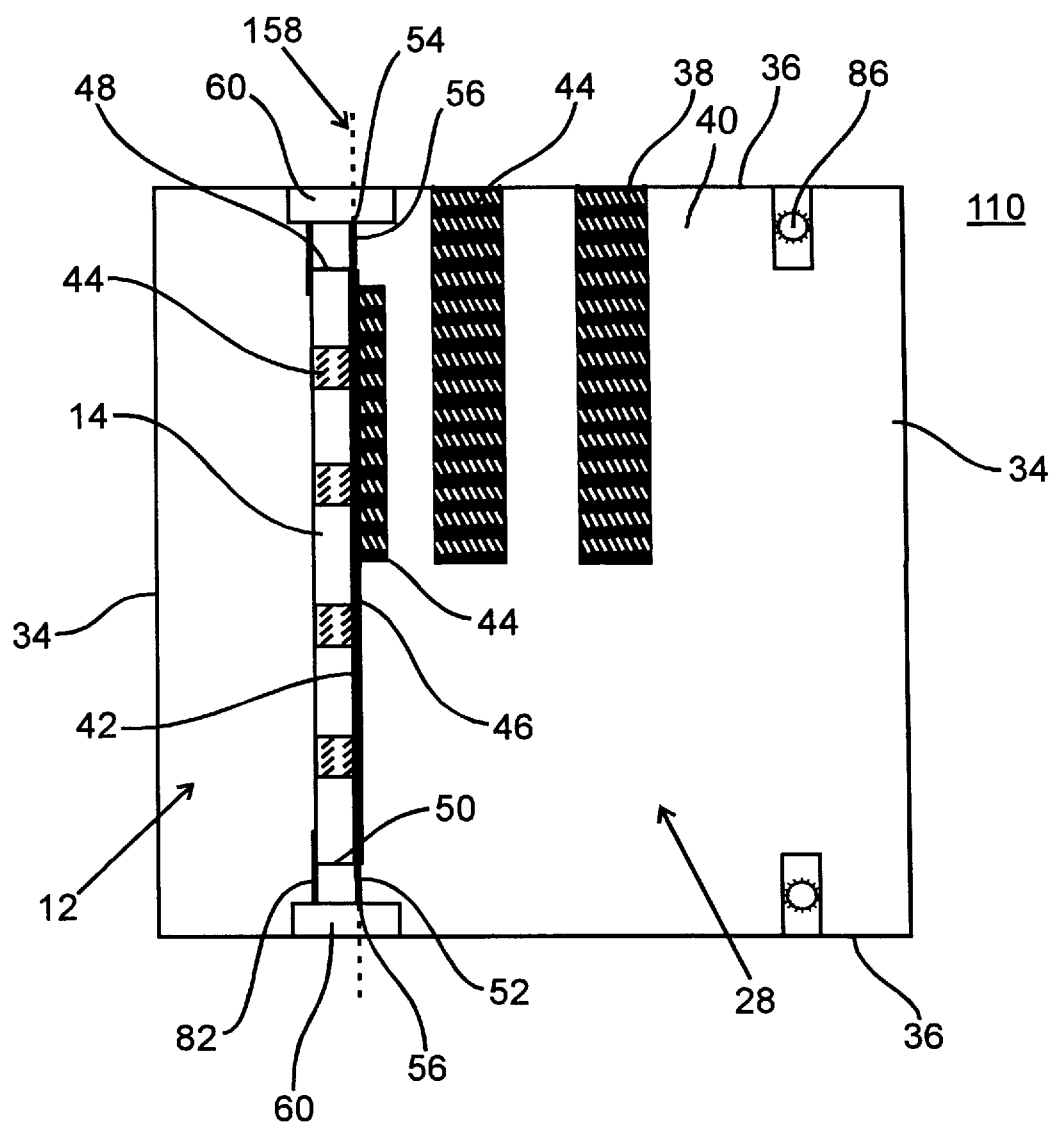
FIG. 5 is an isolated front view of an individual cell of a control center enclosing another embodiment of a control device which is pivoted in position for accessing interior electrical component mounting surfaces.

FIG. 5 depicts another embodiment 110 of the present invention illustrating a pivotal axis 158 vertical to the control center. The cell 12 is defined by the front face 32 and opposing side panels 34 and 36 which are disposed in a parallel relation to each other and perpendicular to the front face 32. The cell mounting surface 38 at least partially defines the rear panel 40 of the cell opposite the front face 32 and faces the interior space 28. The control device 14 includes the front mounting surface 42 and the rear mounting surface 46 for mounting one or more electrical components 44 thereon. The control device 14 is further defined by pairs of opposing side walls 48 and 50. Attached to the side walls 48 are mounting bolts 52. Each of the mounting bolts 52 is secured at one end 54 to one of the side walls 48. The opposite end 56 of each mounting bolt extends toward one of the side panels 36 of the cell and rotatably connects thereto. The mounting bolts 52 define and extend in a parallel direction along a pivotal axis 158 which is vertical to the control center. Preferably, the mounting bolts 52 rotatably connect to mounting brackets 60 that attach to the side panels 36 of the cell. The mounting brackets 60 are of the type described with reference to FIG. 4 above.

Figure 6:
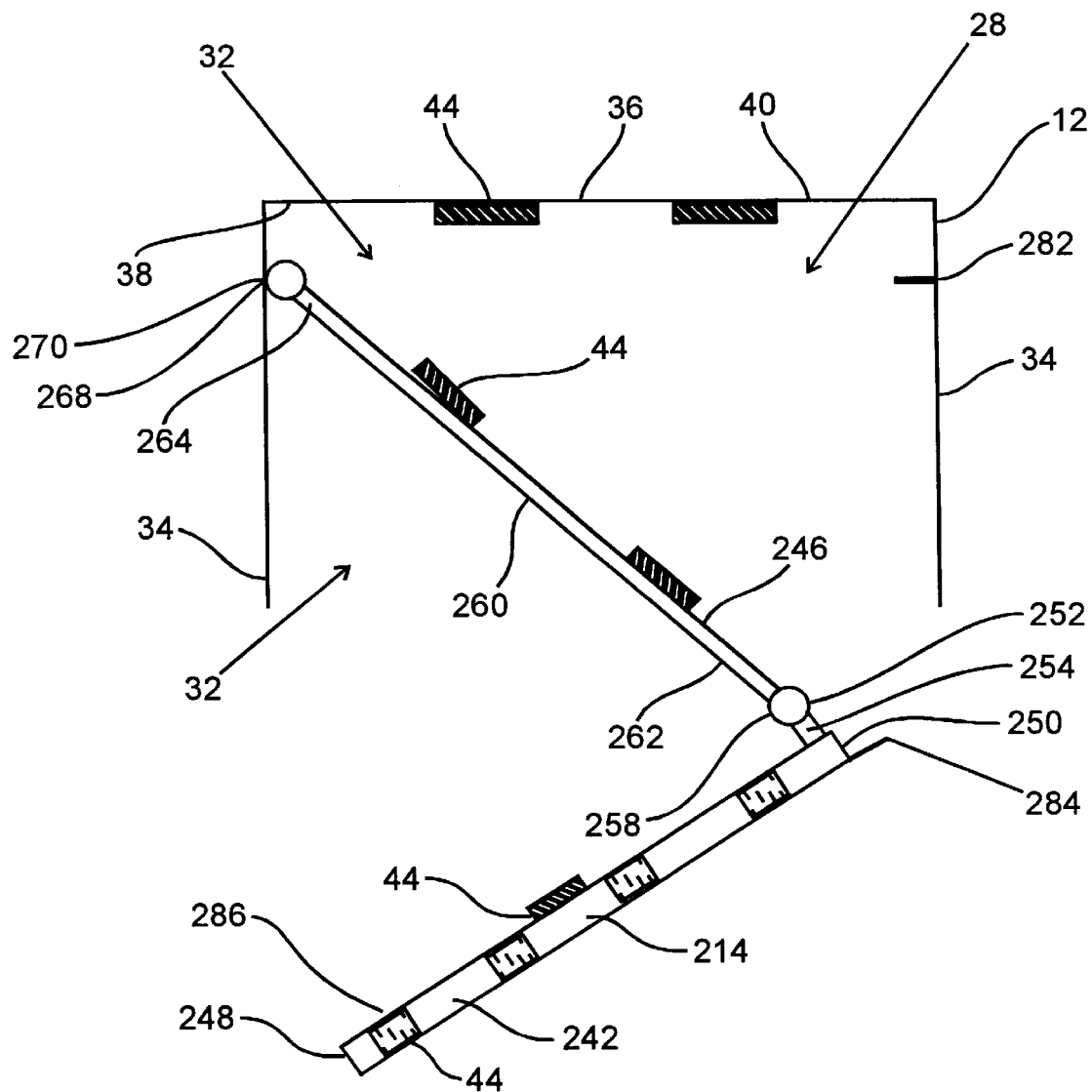
FIG. 6 is an isolated top view an individual cell of a control center enclosing another embodiment of a control device which is partially pivoted in position for accessing interior electrical component mounting surfaces.

Another preferred embodiment 210 of the present invention is depicted in FIG. 6 to illustrate another example of the pivot means used with additional mounting surfaces on the control device. The cell 12 is defined by the front face 32 and opposing side panels 34 which are disposed in a parallel relation to each other and perpendicular to the front face 32. The cell mounting surface 38 at least partially defines the rear panel 40 of the cell 12 opposite the front face 32 and faces the interior space 28. The cell mounting surface 38 is in proximity to the electrical service (not shown) provided to the control center. One or more electrical components 44 can be mounted on the cell mounting surface 38 and electrically connected to the electrical service. The side panels 34 and the rear panel 40 are secured to the framework of the control center (as seen in FIG. 1).

A control device 214 includes a front mounting surface 242, a first rear mounting surface 246, and a second rear mounting surface 286 for mounting one or more electrical components 44 thereon. The control device 214 is further defined by pairs of opposing side walls 248 and 250. A first hinge 252 rotatably connects to an offset 254 in one of the side walls 248 and to one end 262 of an elongated connector 260. Preferably, the offset 254 provides additional clearance for electrical components 44 mounted on the second rear mounting surface 286 when the first hinge 252 is fully closed. The first rear mounting surface 246 at least partially defines one surface of the connector 260 facing the cell mounting surface 38. The opposite end 264 of the connector is rotatably connected to a second hinge 268 which is secured to the side panel 34 of the cell. The first hinge 252 and second hinge 268 define a first and second pivotal axis 258 and 270, respectively, which are vertical to the control center.

Rotating the first and second hinges 252, 268 permits translation movement of the control device 214 towards the front face 32 of the cell. The translation movement is simultaneously accompanied by the rotation movement of the control device 214. When the first and second hinges 252, 268 have rotated until the connector 260 is stopped by one of the side panels 34 of the cell, the control device has made about a 90 degree change from its initial position. The connector 260 provides greater separation between the cell mounting surface 38 and the rear mounting surface 46 of the control device. The sliding movement is particularly useful to provide greater access to the cell mounting surface 38 when the control device has been rotated 90 degrees.

The side panel 34 includes a tab 282 which stops the rotation of the control device 214 along the pivotal axes 258 and 270 at a pre-determined point. The tab 282 also engages a portion of a fastener 284 for securing the control device 214 in position for operation.

The present invention rotates or pivots the control device 214 on the pivotal axis 258 so that the second rear mounting surface 286 of the control device pivots away from the connector 260. The control device 214 pivots on the second pivotal axis 270 so that the first rear mounting surface 246 of the control device pivots away from the cell mounting surface 38.

The pivot means of the present invention also provides for proper alignment between electrical components 44 on the first rear mounting surface 246 and the cell mounting surface 38 so that the respective electrical components 44 can be reversibly mated for electrical and mechanical connection if desired. The pivot means reversibly disengage any electrical and/or mechanical connection between mating electrical components 44. Pivoting the control device 214 exposes the cell mounting surface 38 and the first rear mounting surface 246 of the control device through the front face 32 of the cell and provides greater accessibility to all of the mounting surfaces. The second rear mounting surface 286 is at least partially moved through the front face 32 of the cell for accessibility.

Although hinges 252 and 268 are described for connection between the control device 214 and the cell 12, any rotatably fastener or fastener assembly is suitable for use with the present invention. The pivotal axes 258 and 270 can be positioned at any point along the control device 214 and either the side panels 34 or rear panel 40 of the cell.

The present invention provides a method for providing access to the interior space through a front face of a cell in a control center with a control device inserted therein. As previously described above with regard to the various embodiments, the control device has a mounting surface for at least one electrical component. The cell includes a cell mounting surface facing the interior space and adapted for electrically connecting to the control device mounting surface. At least two portions of a fastener are rotatably connected between the control device and the cell within the interior space to define a pivotal axis. The portions of the fasteners are, for the sake of example and not limitation, like the mounting bolts and brackets described in FIGS. 2–5. Another example of fastener portions are the hinges described in FIG. 6.

The inventive method includes pivoting the control device on the pivotal axis within the cell so that the control device mounting surface pivots away from the cell mounting surface to provide access to the control device mounting surface and the cell mounting surface through the front face of the cell. As described above, the pivoting means is connected to the control device and to the cell. The control device is releasably fastened to the cell to prevent pivoting the control device while the control device is electrically connected. Preferably, the pivoting step of the method includes sliding the control device at least partially through the front face of the cell either simultaneously or successively with the pivoting of the control device.

As those skilled in the art will appreciate, the inventive control device assembly can be adapted and configured for usage with a wide variety of control centers. For example, the shape of the mounting brackets, hinges, or other fastener, can be adapted to utilize features of a control center framework and/or cell to attach to a corresponding fastener portion on the control device which allows upgrading control centers already in the marketplace.

The present invention is specifically disclosed for use with control centers manufactured by the Square D Company under the catalog designation MODEL 6® and MODEL 5® (registered trademarks of the Square D Company) and other power output units are a type of the control devices referred to herein. In particular, the preferred embodiment is used as either an original equipment or aftermarket attachment. These control units are used in control centers which have been in the marketplace for years and have been continually updated.

It will be further understood that whereas the term control centers is defined to include, but not be limited to, motor control centers and switchgear. Likewise, the term control devices is defined to include motor controls and other types of control units like circuit breakers, switches, fuses, and combinations thereof. The term electrical components is defined to include, but not be limited to, power logic circuits, bus bars, programmable logic controllers, control relays, motor starters, protective relays, electrical timers, all types of electrical connectors such as terminals, plugs, lugs, stabs, etc.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A control device for a control center having at least one cell defining an interior space with a front face for receiving and electrically connecting the control device therein, the cell having a cell mounting surface facing the interior space, the device comprising:

a front mounting surface for mounting at least one electrical component thereon, the front mounting surface partially defining a front face;

a plurality of side walls disposed in parallel relation to each other and perpendicular to the front face;

a rear mounting surface for mounting at least one electrical component thereon, the rear mounting surface partially defining a rear face opposite the front face, the side panels and the front and rear mounting surfaces being secured together for insertion into the interior space of the cell so that the rear mounting surface faces the cell mounting surface;

means for pivoting the control device on a pivotal axis within the cell so that the rear mounting surface pivots away from the cell mounting surface to provide access to the rear mounting surface and the cell mounting surface through the front face of the cell, the pivoting means being connected to the control device and adapted to be connected to the cell, the pivoting means having a pair of mounting bolts, each mounting bolt is secured to one of the opposing side walls along the pivotal axis and extends perpendicularly towards the interior space of the cell, the cell is adapted to pivotally retain the end of the mounting bolts; and means for releasably fastening the control device to the cell to prevent pivoting the control device while the control device is electrically connected, a portion of the fastening means integrally formed with the side walls.

2. The device of claim 1 wherein the mounting bolts extend along the pivotal axis which is horizontal to the front face of the cell.

3. The device of claim 1 wherein the mounting bolts having ends adapted to slideably retain the cell so that the control device is slid partially out through the front face of the cell.

4. The device of claim 1 wherein the pivoting means further includes reversibly mating the electrical component on the rear mounting surface to the cell mounting surface while the control device is electrically connected.

5. The device of claim 1 wherein the pivoting means pivots the control device about 90 degrees from the position when the control device is electrically connected.

6. The device of claim 1 wherein the pivoting means includes a hinge defining the pivotal axis, the hinge rotatably connects one of the side walls of the control device and is adapted to connect to the cell.

7. The device of claim 6 wherein the hinge extends along a pivotal axis which is vertical to the front face of the cell.

8. The device of claim 1 wherein the pivoting means includes a connector having two ends, the connector is disposed between a first hinge and a second hinge, the first hinge defining the pivotal axis and rotatably connects to one end of the connector and to one of the side walls of the control device, the second hinge defining a second pivotal axis, the second hinge is adapted to rotatably connect the opposite end of the connector to the cell.

9. The device of claim 8 wherein the connector provides a second rear mounting surface for mounting at one electrical component thereon, the second rear mounting surface facing the cell mounting surface when the control device is inserted in the cell.

10. A center for controlling electrical service with at least one control device, the control device having a mounting surface for at least one electrical component, the center comprising:

a partially enclosed framework;

at least one cell defined in the framework by a front face, by side panels disposed in parallel relation to each other and perpendicular to the front face, and by a mounting surface partially defining a rear panel of the cell opposite the front face, the side panels and rear panel being secured to the framework, the cell having an interior space for receiving the control device therein, the cell mounting surface facing the interior space and adapted for electrically connecting to the control device mounting surface;

means for pivoting the control device on a pivotal axis within the cell so that the control device mounting surface pivots away from the cell mounting surface to provide access to the cell mounting surface and the mounting surface of the control device through the front face of the cell, the pivoting means being connected to the control device and to the side or rear panels of the cell, the pivoting means reversibly mating the electrical component on the rear mounting surface to the cell mounting surface while the control device is electrically connected; and means for releasably fastening the control device to the cell to prevent pivoting the control device while the control device is electrically connected, a portion of the fastening means integrally formed with the side panels.

11. The device of claim 10 wherein the pivoting means includes a pair of mounting brackets, each mounting bracket is secured to one of the opposing side panels along the pivotal axis and extends perpendicularly towards the interior space of the cell, each bracket is adapted to pivotally retain a portion of a fastener, another portion of the fastener being secured to the control device.

12. The device of claim 11 wherein the portions of the fastener extend along the pivotal axis which is horizontal to the front face of the cell.

13. The device of claim 11 wherein each bracket includes a slot defining a first channel with an open end, the open end adapted for receiving the portion of the fastener and rotatably retaining the portion of the fastener in the first channel.

14. The device of claim 13 wherein the slot further includes a second channel connected to the first channel, the second channel having an elongated shape partially extending perpendicularly between the front face and the rear panel, the second channel adapted to slideably retain the fastener portion therein so that the control device is reversibly slid partially out through the front face of the cell.

15. The device of claim 10 wherein the pivoting means includes a hinge defining the pivotal axis, the hinge rotatably connects one of the side panels or the rear panel of the cell to the control device.

16. The device of claim 11 wherein the pivoting means includes a connector having two ends, the connector is disposed between a first hinge and a second hinge, the first hinge defining the pivotal axis and rotatably connects to one end of the connector and to one of the side walls of the control device, the second hinge defining a second pivotal axis, the second hinge is adapted to rotatably connect the opposite end of the connector to the cell.

17. A method for providing access to the interior space through a front face of a cell in a control center with a control device inserted therein, the control device having a mounting surface for at least one electrical component, the cell having a cell mounting surface facing the interior space and adapted for electrically connecting to the control device mounting surface, the steps of the method comprising:

rotatably connecting at least two portions of a fastener between the control device and the cell within the interior space to define a pivotal axis;

pivoting the control device on the pivotal axis within the cell so that the control device mounting surface pivots away from the cell mounting surface to provide access to the control device mounting surface and the cell mounting surface through the front face of the cell;

reversibly mating the at least one electrical component on the control device mounting surface to the cell mounting surface while the control device is electrically connected; and releasably fastening the control device to the cell to prevent pivoting the control device while the control device is electrically connected.

18. The method of claim 17 wherein the pivoting step of the method includes sliding the control device at least partially our through the front face of the cell either simultaneously or successively with the pivoting of the control device.

* * * * *